United States Patent [19]
Keyser

[11] Patent Number: 5,865,499
[45] Date of Patent: Feb. 2, 1999

[54] CAMPER CRANK

[76] Inventor: Norbert R. Keyser, 3250 Eiler Rd., De Pere, Wis. 54115

[21] Appl. No.: 831,146

[22] Filed: Apr. 1, 1997

Related U.S. Application Data

[60] Provisional application No. 60/014,442, Apr. 1, 1996.

[51] Int. Cl.[6] ...................................................... B60P 3/355
[52] U.S. Cl. ........................ 296/173; 296/26.04; 296/156; 74/606 R
[58] Field of Search ..................................... 296/173, 156, 296/172, 176, 26.04, 26.05, 26.06, 26.07, 26.02; 74/625, 606 R

[56] References Cited

U.S. PATENT DOCUMENTS

| | | |
|---|---|---|
| 3,024,059 | 3/1962 | Hagenson . |
| 3,507,535 | 4/1970 | Wallace . |
| 3,514,150 | 5/1970 | Wallace . |
| 3,572,163 | 3/1971 | Clark ........................................... 74/625 |
| 3,981,529 | 9/1976 | Bontrager . |
| 4,280,373 | 7/1981 | Denkowski et al. ....................... 74/925 |
| 4,657,300 | 4/1987 | Penny et al. .............................. 296/173 |
| 4,872,230 | 10/1989 | Levine . |
| 5,354,215 | 10/1994 | Viracola . |

Primary Examiner—Joseph D. Pape
Attorney, Agent, or Firm—Richard C. Litman

[57] ABSTRACT

A camper crank drive mechanism provides for the powered operation of the top erecting and retracting mechanism of a camper vehicle having a folding top. The present mechanism secures to the camper structure, and has an output shaft which engages the conventional crank input of the camper vehicle. The crank drive mechanism comprises a gear speed reduction unit, which reduces the input speed and multiplies the input torque considerably, in order to allow a relatively small and lightweight battery operated power tool (cordless electric drill, power screwdriver, etc.) to be used to operate the reduction mechanism. The mechanical advantage provided by the mechanism allows it to serve as a mechanical lock of the top erection and retraction mechanism, precluding inadvertent collapse of the top during the intermediate phase of the erection or retraction operation. The power tool used to operate the gear mechanism may be powered by its own internal battery, or may alternatively be powered by a larger external battery, if desired, which external battery may be recharged from the towing vehicle charging system.

17 Claims, 3 Drawing Sheets

CAMPER CRANK

REFERENCE TO RELATED PATENT APPLICATION

This application claims the benefit of U.S. Provisional Patent Application Serial No. 60/014,442, filed on Apr. 1, 1996.

BACKGROUND OF THE INVENTION

1. Field of the Invention

The present invention relates generally to powered or automated tools and devices for operating a conventionally manually operated device, and more particularly to an electrically powered device for raising and lowering the top of a vertically folding camper or trailer. The device generally comprises a gear reduction unit which has an output driving the camper raising and lowering mechanism, and an input driven by a portable electric drill, electric screwdriver, or similar "cordless" power tool. The power tool may be powered by a self contained battery pack, or may alternatively be powered by a larger remote battery electrically connected thereto by a specialized power cord and connector assembly, to provide a longer duration of operation between recharges of the battery. The remote battery may be electrically connected to the electrical system of the towing vehicle and trailer, if desired, in order to maintain the electrical charge of the remote battery for use when desired.

2. Description of the Related Art

Vertically folding campers and camper trailer vehicles have been known for quite some time, as their advantages in terms of compact storage and ease of towing due to the relatively low center of gravity and lowered wind resistance, are well known. Typically, such campers or trailers include a relatively complex mechanism to raise or lower the upper portion of the camper, generally by means of a hand operated crank. While the upper portion of such a camper typically weighs no more than a few hundred pounds at the most, the mechanical friction involved in the relatively complex mechanism, and the need to raise the upper portion by at least a few feet, result in considerable manual effort being required to raise and lower the top of such a camper using the conventional hand crank commonly provided with such equipment.

The physical effort involved can be quite daunting to many persons, particularly those who may suffer from arthritis or some other problem which makes it difficult for them to manipulate a hand crank with the force required. Also, the effort required to raise and lower the upper portion of such campers and trailers often discourages the owners of such vehicles from using them for relatively short stays at any given location, as some may not consider it worth the effort of erecting and lowering the upper portion of the device for a short stay. This is a shame, as the efficiency and compact storage of such folding campers and the like makes them highly desirable to many persons.

Accordingly, a need will be seen for a device which is adaptable to the crank mechanism of a folding camper, trailer, or the like, and which provides for the powered raising or lowering of the folding portion of the vehicle. The device preferably incorporates a sufficiently high gear reduction that a relatively small electric motor may be used, with the gear reduction further serving as a locking mechanism to preclude the collapse of the folding portions of the camper. The electrically powered component may comprise a cordless electric drill, screwdriver, or the like, including a slip clutch so as to preclude burnout of the motor when the camper top reaches its full extension or retraction. The present invention may also include means of electrically connecting the electric drive unit to a larger remote battery, for longer operation between recharging of the battery. A discussion of the prior art known to the present inventor, and its differences and distinctions from the present invention, is provided below.

U.S. Pat. No. 3,024,059 issued on Mar. 6, 1962 to Leo J. Hagenson describes a Collapsible And Expanding House Trailer, wherein the upper portion retracts and extends vertically from the lower portion. Portions of the side walls fold inwardly when the top is retracted. Hagenson provides a permanently installed electric motor permanently connected to the drive mechanism for the upper portion of the trailer, and which is permanently connected electrically to a conventional 12 volt vehicle battery. The present motor is removably attached to the gear box crank mechanism of the folding camper, and is physically removed when not in use.

U.S. Pat. No. 3,507,535 issued on Apr. 21, 1970 to Joseph D. Wallace describes a Camping Trailer Lift Mechanism using a manual crank to operate a jack screw, which in turn raises and lowers a series of cables disposed within the telescoping corners of the vehicle. The vehicle disclosed is essentially that of the well known folding camper produced by the Coleman Company, and the rights to the invention have been assigned to the Coleman Company. No powered or automated means of raising or lowering the top of the Wallace camper vehicle is disclosed. The present invention is adaptable for portable powered use in raising and lowering the upper portion of a camper vehicle such as the Wallace vehicle, as Wallace does not anticipate any need for such a portable powered means of operating the upper portion of his vehicle.

U.S. Pat. No. 3,514,150 issued on May 26, 1970 to Joseph D. Wallace describes a Camping Trailer Lift Mechanism similar to that discussed immediately above in the '535 patent to the same inventor. In the later '150 patent, the inventor recognizes the need for some powered means of raising and lowering the upper portion of the camper vehicle, and provides an electric motor to do so. However, the motor is permanently mounted to the trailer frame, unlike the portable and hand held unit of the present invention. The portable and removable nature of the present hand operated power drive allows the drive to be removed in the event of malfunction, and the top of the camper operated manually. No such manual operation is possible with the permanently installed motor of the Wallace '150 patent.

U.S. Pat. No. 3,981,529 issued on Sep. 21, 1976 to Lloyd L. Bontrager describes a Lift Mechanism For A Camper Top, having a manually operated crank which is used to raise and lower the top through a mechanical linkage. Bontrager provides only a means of releasing the ratchet action when the crank is turned to lower the top. No automated raising or lowering means is provided by Bontrager, either permanently installed or portable.

U.S. Pat. No. 4,657,300 issued on Apr. 14, 1987 to Steven J. Penny et al. describes a Camper having a folding roof and side walls actuated by a mechanical linkage and powered by an electric motor. Aside from the question of operability raised by the arrangement of the pinion drive gear and worm driven gear, it is noted that the electric motor is permanently connected and permanently installed within the structure of the camper, unlike the portable, externally disposed motor of the present crank system.

U.S. Pat. No. 4,872,230 issued on Oct. 10, 1989 to Anthony Levine describes an Electrically Powered Automobile Jack And Nut Remover, comprising an electric motor and gear reduction drive which is powered from the cigarette lighter or auxiliary electrical power outlet of an automobile. However, the motor and transmission are permanently assembled to the jack, and cannot be removed, as in the case of the portable drive of the present system. In order for the Levine device to be used as a wheel lug remover, the entire jack with its attached motor and transmission must be positioned to engage the wheel lugs.

Finally, U.S. Pat. No. 5,354,215 issued on Oct. 11, 1994 to Joseph R. Viracola describes a Circuit Interconnect For A Power Tool, comprising a "dummy" battery which is electrically connectable to an electrical power source, such as the 12 volt cigarette lighter or auxiliary power output of an automobile. The device essentially takes up the physical space of a removed battery pack within the handle of a cordless power tool. Viracola is silent regarding any voltage conversion which may be required to operate the tool at the proper voltage, and does not disclose a speed reduction gearbox or any means of driving a folding camper extension and retraction mechanism, as provided by the present invention.

None of the above inventions and patents, taken either singly or in combination, is seen to describe the instant invention as claimed.

SUMMARY OF THE INVENTION

The present invention comprises a camper crank drive mechanism for an extendible and retractable camper or trailer top. The drive generally comprises a portable electric power tool (drill, screwdriver, etc.) and gear speed reduction unit, with the speed reduction unit being clamped or otherwise secured to the camper vehicle and having an output which is engaged with the input shaft for the top raising and lowering mechanism. The drive may be a cordless device with its own internal battery, or may alternatively receive power from a larger external battery, if desired.

Accordingly, it is a principal object of the invention to provide an improved drive mechanism for the top of a camper vehicle having an extendible and retractable top, comprising a gear speed reduction unit secured to the camper vehicle and engaging the camper top actuation drive, with the reduction unit being powered by a removably engageable, portable electric power tool.

It is another object of the invention to provide an improved camper top drive mechanism which power tool comprises a cordless device with a self contained battery.

It is a further object of the invention to provide an improved camper top drive mechanism which power tool may be powered by a relatively larger external battery, with a power cord extending between the external battery and the power tool.

An additional object of the invention is to provide an improved camper top drive mechanism which gear speed reduction unit comprises a worm drive mechanism, providing significant speed reduction and torque multiplication for use with a small power tool while simultaneously serving as a mechanical lock to preclude inadvertent lowering of the camper top.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
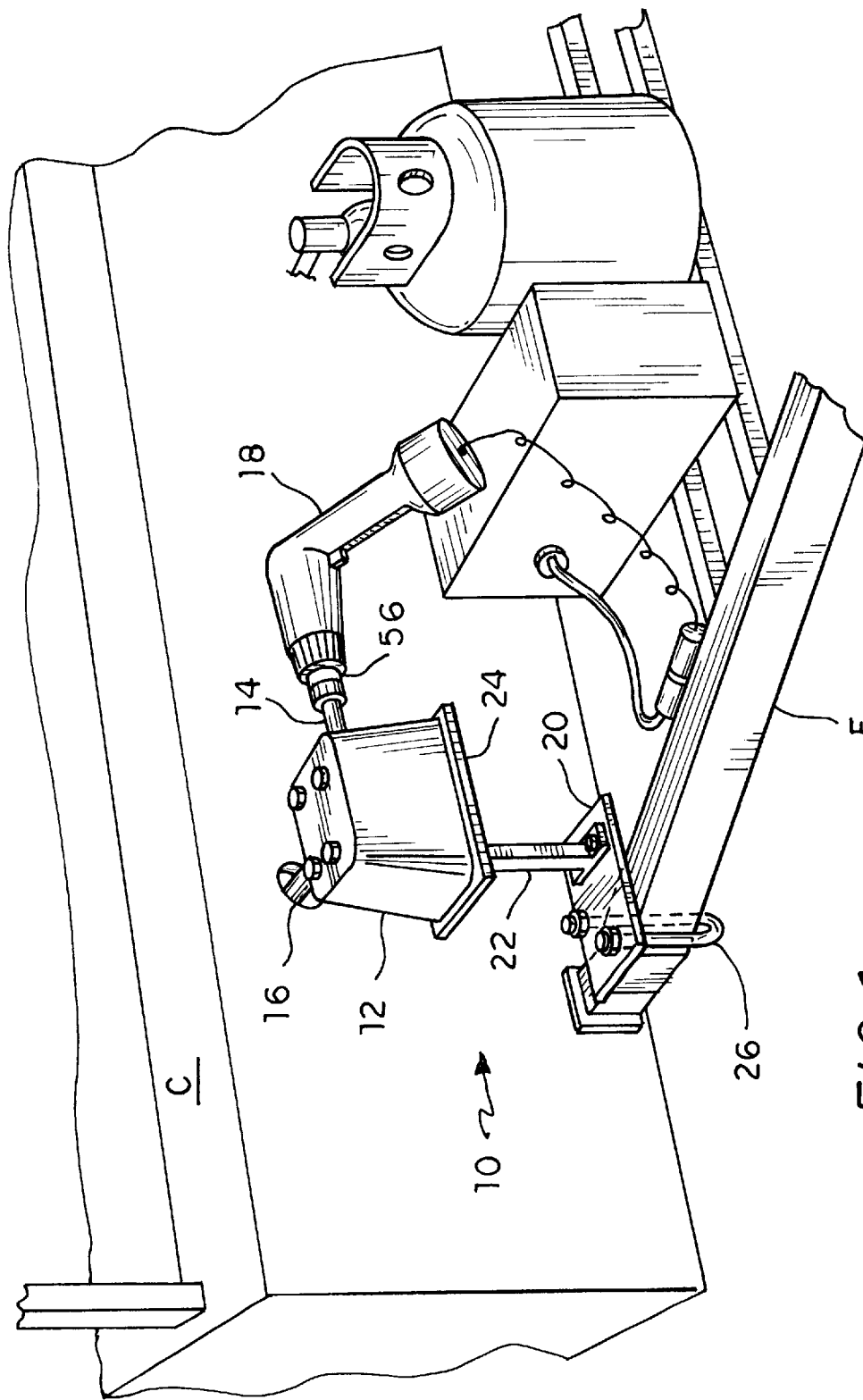
FIG. 1 is a left front perspective view of the present camper crank invention, comprising a gear speed reduction unit secured to the camper vehicle with a portable electric power tool removably engaged with the reduction unit.

The present invention comprises an electrically powered camper crank drive mechanism, for the powered extension and retraction of the conventional folding top mechanism of a conventional folding camper trailer vehicle or the like having an external rotary input for top extension and retraction. FIG. 1 provides a perspective view of a first embodiment of the present invention, with the crank drive mechanism 10 being secured to the tongue structure or frame F of a camper vehicle C having a folding top. (The camper vehicle structure and its folding top are conventional, with only sufficient structure shown in FIGS. 1 and 2 to show the attachment and operation of the present invention with such a camper vehicle C.)

The camper crank drive mechanism 10 includes a crank mechanism with a closed and sealed gearbox 12, including an input shaft 14 and output shaft 16 extending from the box 12. The input shaft 14 serves to drive the gear speed reduction drive enclosed within the gearbox 12, discussed further below, and is dimensioned and configured to engage removably with the output or drive of an electrically powered hand tool, such as the cordless electric drill 18 shown in FIG. 1. The output shaft 16 of the gearbox 12 engages the conventional rotary input shaft (not shown) of the camper vehicle, which is configured to accept a manually operated crank normally used to raise and lower the top of such a camper C.

Figure 3:
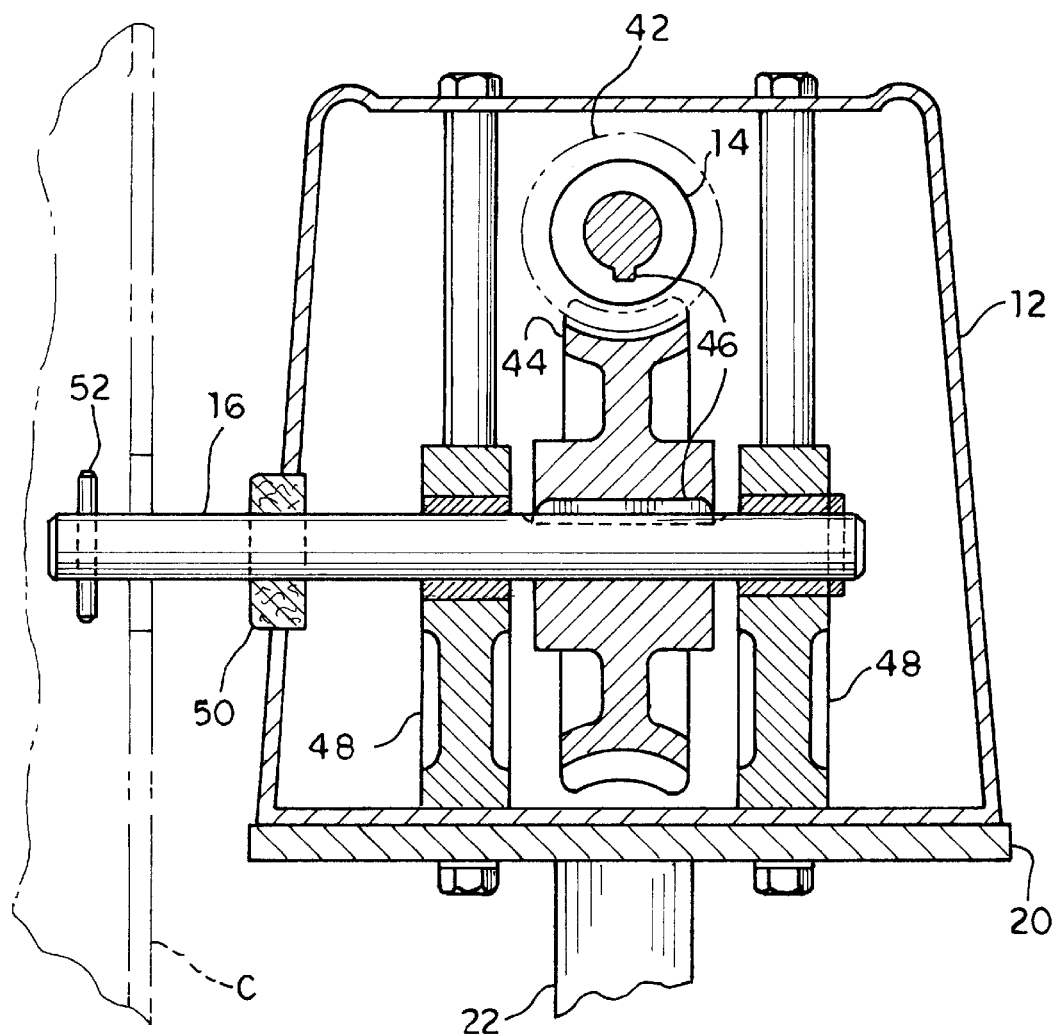
FIG. 3 is a side elevational view in section of the speed reduction unit of the present invention.

The gearbox 12 of the crank mechanism 10 is mounted on a gearbox attachment plate 20, which in turn is affixed to a gearbox support column 22. The support column 22 extends between the gearbox attachment plate 20 and a base plate 24 to affix the gearbox 12 immovably to the base plate 24. The base plate 24 is removably secured to the camper frame structure F by at least one U bolt 26, which depends from the base plate 24 to extend around one of the members of the frame F, thereby affixing the gearbox 12 to the camper frame F. Typically, such campers C have a rotary input shaft adjacent the front of the vehicle, which is accessed through a hole or passage in the front of the vehicle, as shown in FIGS. 1 and 3. The U bolt mounting arrangement of the present drive mechanism 10 allows the mechanism 10 to be adjustably positioned with the gearbox output shaft 16 in engagement with the input shaft of the camper C, as shown.

Figure 2:
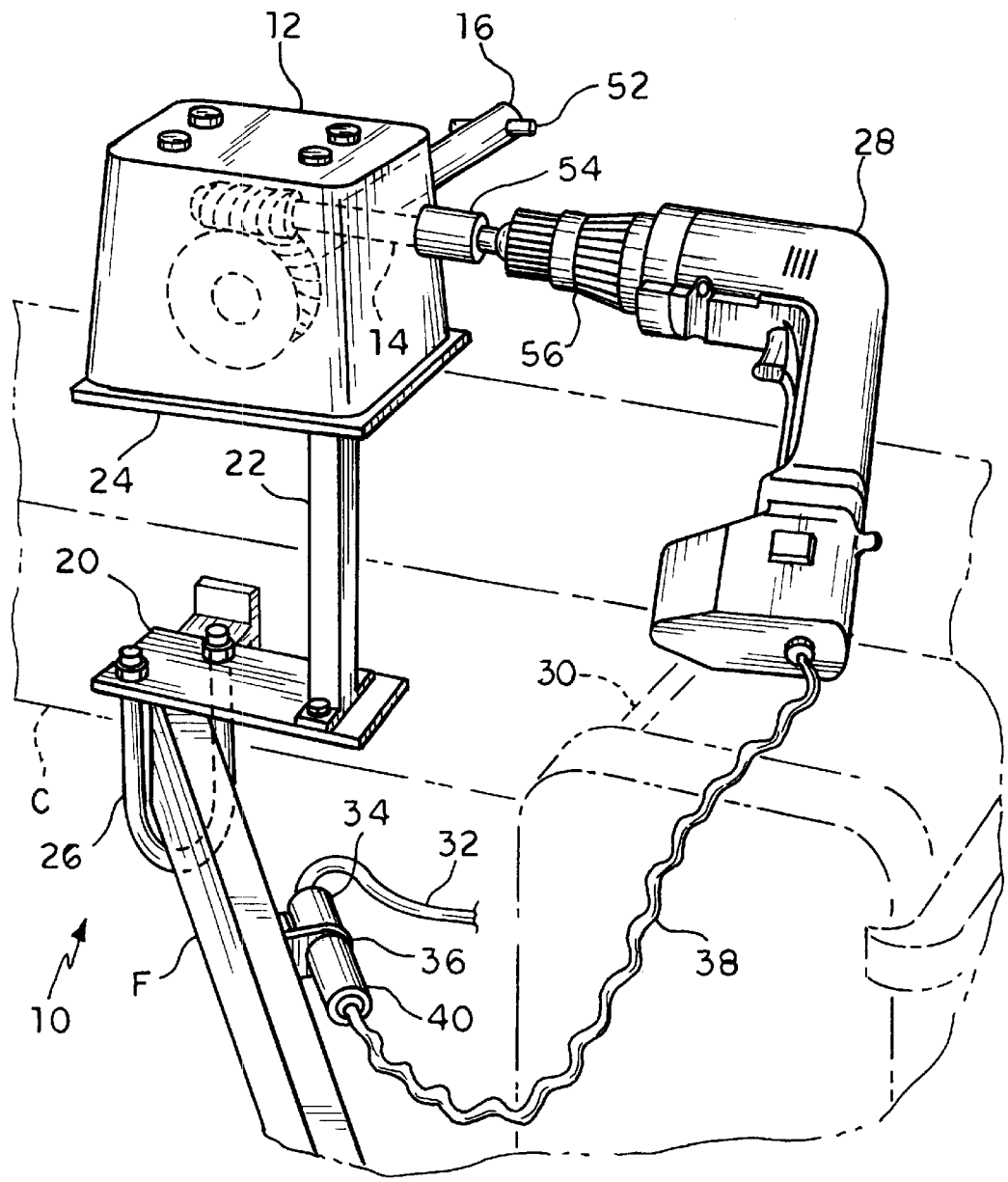
FIG. 2 is a right front perspective view, showing the engagement of the power tool with the speed reduction unit, and the output of the speed reduction unit to drive the camper mechanism.

FIG. 2 provides a more detailed view of the camper crank mechanism 10, and an alternate embodiment power means for the mechanism. The gearbox 12 and its support bracket of components 20 through 26 are identical to those disclosed in FIG. 1, but the hand tool 28 used to provide power to the gearbox 10 is somewhat different from the tool 18 of FIG. 1. In FIG. 1, the tool 18 is completely cordless, relying upon an internal battery power supply normally disposed within the handgrip of the device, as is well known in the art. However, the hand tool 28 of FIG. 2 is powered by a larger external battery 30, such as the battery which might be used for electrical power to the camper C while in use.

A fixed, two conductor power cord 32 is electrically connected to the battery 30 in the conventional manner, i.e., with one conductor connected to the positive terminal of the battery 30 and the second conductor connected to the negative terminal. The opposite end of the power cord 32 is affixed to a receptacle 34 (cigarette lighter receptacle, or other suitable electrical connector), with the receptacle 34 affixed within a bracket 36 which is secured to the camper frame F. A second removable cord 38 has a plug 40 in one end thereof which is removably connectable within the socket 34, and is electrically connected to the hand tool 28 to provide electrical power thereto. Assuming the hand tool 28 requires twelve volt direct current electrical power, no additional electrical adapters or power conversion is required, and the hand tool 28 may be operated from the large electrical storage battery 30 for sustained operation.

FIG. 3 provides a detailed view of the internal structure of the gearbox 12. Preferably, the gearbox 12 is adapted to provide a significant gear speed reduction (and thus torque multiplication) from the input shaft 14 to the output shaft 16, i.e., the input shaft 14 turns many times faster than the output shaft 16. This ratio is preferably on the order of twenty to one, with the input shaft 14 turning twenty revolutions for each revolution of the output shaft 16. This provides a torque multiplication of twenty to one (neglecting gear and bearing friction), enabling the top of the camper to be erected or folded using the relatively low torque of an electrical hand tool, such as a cordless drill 18.

This is accomplished in the present gearbox 12 by a worm and pinion gear configuration, with the tool 18 or 28 driving a helical cut worm gear 42 (with the outer circumference shown in broken lines) which is meshed with an appropriately cut pinion gear 44. (Other gear train configurations may be used as desired, but the relatively large speed differential between the input and output shafts 14 and 16 is important.) The input and output shafts 14 and 16 are secured to their respective gears 42 and 44 by keys 46 or other suitable means, with the shafts 14 and 16 being secured within the gearbox 12 and relative to one another by bearing blocks, e.g., the bearing blocks 48 supporting the output shaft 16. An oil seal 50 is provided along the input and output shafts 14 and 16 where they enter and exit the gearbox 12, as the gearbox 12 is preferably substantially oil filled in order to lubricate the gears 42 and 44 and associated bearings.

The camper crank drive mechanism 10 is used by installing the gearbox support bracket (comprising the gearbox base plate 24, support column 22, and gearbox attachment plate 26) to the frame F of the camper C, using the U bolt 26 or other suitable means. The U bolt attachment means provides some adjustment in the position of the gearbox 12, and particularly the output shaft 16, so the lateral pin 52 of the output shaft 16 (or other engagement means) will engage the conventional slots of the camper rotary input shaft (not shown). The output shaft 16 of the gearbox 12 thus remains constantly engaged with the camper top mechanism input shaft, unless the gearbox 12 is moved or removed by adjusting or removing the U bolt clamp from around the frame member F of the camper C.

When it is desired to raise the camper top, a cordless electric drill 18, electric screwdriver, or other suitable battery powered and reversible rotary tool is engaged with the input shaft 14 of the gearbox 12. (The end of the input shaft 14 may have a male hexagonal fitting, e.g., bolt head, with the drill having a six or twelve point socket 54 chucked therein; other suitable removable connecting means may be used.)

The power tool 18 (or 28) is then actuated to turn the input shaft 14 of the gearbox 12, causing the output shaft 16 to turn the camper top input shaft as described further above. The power tool 18 or 28 may be braced against the adjacent structure (camper body, frame, etc.) to counteract the torque effect of the tool while it is in operation, so the tool need not be held manually during the entire operation of raising or lowering the camper top, which may take a few minutes. The large torque multiplication provided by the present gearbox 12 also precludes inadvertent retraction of the top in the event the power tool is removed at some intermediate point, as the worm gear principle serves as a mechanical lock against the mechanical forces occurring due to gravity urging the top downward during the intermediate phase of raising the top.

The power tool 18 or 28 used with the present invention includes a safety clutch 56, precluding the application of excessive torque to a fitting while in use, and also precluding damage to the gear train and motor within the tool. The safety clutch 56 also precludes overtorquing the gear train and motor of the power tool 18 or 28 when the camper top reaches its maximum extended position and is mechanically limited from further extension.

Lowering the top is accomplished in much the same manner, by merely reversing the direction of rotation of the tool 18 or 28. Again, the safety clutch 56 precludes damage to the tool 18 or 28, and/or to the gearbox 12, when the top reaches its fully retracted position.

In summary, the present camper crank mechanism will be seen to be of great value to the owners of campers having retractable tops. The addition of the gearbox, in combination with a conventional cordless power tool (which may be powered using an auxiliary battery, as described above) enables a person to erect and retract the top of the camper easily and conveniently, without undue exertion or stress. This is important to many persons, particularly those with infirmities of various types, and will be much appreciated by all.

It is to be understood that the present invention is not limited to the sole embodiment described above, but encompasses any and all embodiments within the scope of the following claims.

I claim:

1. A camper crank mechanism for use with a camper having a folding top with a maximum extended position and minimum retracted position and actuated by a rotary input, comprising:

a closed gearbox;

a gear speed reduction drive disposed within said closed gearbox;

an input shaft extending from said gearbox, said input shaft driving said gear speed reduction drive and being dimensioned and configured for removably engaging a powered hand tool;

an output shaft driven by said gear speed reduction drive and engaging the rotary input of the camper;

said gear speed reduction drive producing a greatly reduced speed for said output shaft relative to said input shaft when said input shaft is rotated; and a gearbox support bracket extending from said gearbox, for attaching said gearbox to the camper.

2. The camper crank mechanism according to claim 1, wherein said gear speed reduction drive comprises a worm gear and a pinion gear meshed with said worm gear and being driven thereby, with said input shaft driving said worm gear and said output shaft being driven by said pinion gear.

3. The camper crank mechanism according to claim 2, wherein said gear speed reduction drive has a gear ratio of substantially twenty to one, with said input shaft turning twenty revolutions for each revolution of said output shaft.

4. The camper crank mechanism according to claim 1, wherein said gearbox support bracket comprises:

a base plate;

a gearbox attachment plate secured to said gearbox; and a gearbox support column extending between said base plate and said attachment plate, for immovably securing said attachment plate to said base plate.

5. The camper crank mechanism according to claim 4, wherein said base plate includes at least one U bolt depending therefrom for removably securing said base plate to the camper.

6. The camper crank mechanism according to claim 1, including a portable electric power hand tool for automatically rotating said input shaft.

7. The camper crank mechanism according to claim 6, wherein said portable electric power hand tool is a cordless electric drill having a self contained battery.

8. The camper crank mechanism according to claim 6, wherein said portable electric power hand tool is powered by a separate storage battery remotely connected thereto.

9. The camper crank mechanism according to claim 6, wherein said portable electric power hand tool includes a safety clutch for slipping under excessive torque when the camper top reaches its maximum extended position and minimum retracted position.

10. A powered camper crank drive for use with a camper having a folding top with a maximum extended and minimum retracted position and actuated by a rotary input, comprising in combination:

a portable, electric power hand tool;

a camper crank mechanism including a closed gearbox;

a gear speed reduction drive disposed within said closed gearbox;

an input shaft extending from said gearbox, said input shaft driving said gear speed reduction drive and being dimensioned and configured for removably engaging said power hand tool;

an output shaft driven by said gear speed reduction drive and engaging the rotary input of the camper;

said gear speed reduction drive producing a greatly reduced speed for said output shaft relative to said input shaft when said input shaft is rotated; and a gearbox support bracket extending from said gearbox, for attaching said gearbox to the camper.

11. The camper crank drive combination according to claim 10, wherein said gear speed reduction drive comprises a worm gear and a pinion gear meshed with said worm gear and being driven thereby, with said input shaft driving said worm gear and said output shaft being driven by said pinion gear.

12. The camper crank drive combination according to claim 11, wherein said gear speed reduction drive has a gear ratio of substantially twenty to one, with said input shaft turning twenty revolutions for each revolution of said output shaft.

13. The camper crank drive combination according to claim 10, wherein said gearbox support bracket comprises:

a base plate;

a gearbox attachment plate secured to said gearbox; and a gearbox support column extending between said base plate and said attachment plate, for immovably securing said attachment plate to said base plate.

14. The camper crank drive combination according to claim 13, wherein said base plate includes at least one U bolt depending therefrom for removably securing said base plate to the camper.

15. The camper crank drive combination according to claim 10, wherein said portable electric power hand tool is a cordless electric drill having a self contained battery.

16. The camper crank drive combination according to claim 10, wherein said portable electric power hand tool is powered by a separate storage battery remotely connected thereto.

17. The camper crank drive combination according to claim 10, wherein said portable electric power hand tool includes a safety clutch for slipping under excessive torque when the camper top reaches its maximum extended position and minimum retracted position.

* * * * *